United States Statutory Invention Registration [19]

[11] Reg. Number: H103

Gilbert

[45] Published: Aug. 5, 1986

[54] NOVEL POLY(VINYLAZIDE)

[75] Inventor: Everett E. Gilbert, Morristown, N.J.

[73] Assignee: The United States of America as represented by the Secretary of the Army, Washington, D.C.

[21] Appl. No.: 711,892

[22] Filed: Mar. 14, 1985

[51] Int. Cl.[4] ..... C08F 8/30; C06B 45/10

[52] U.S. Cl. ..... 525/331.5; 525/366; 149/19.91

*Primary Examiner*—John F. Terapane
*Assistant Examiner*—Jack Thomas
*Attorney, Agent, or Firm*—Anthony T. Lane; Robert P. Gibson; Edward F. Costigan

[57] ABSTRACT

Poly(vinylazide) having less then 1.5 percent chlorine. The product, i.e., poly(vinylazide) being the reaction product of poly(vinylchloride) and sodium or lithium azide by heating the gel product for an extended period of time in the presence of the azide reactant.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NOVEL POLY(VINYLAZIDE)

GOVERNMENTAL INTEREST

The invention described herein may be manufactured, used and licensed by or for the Government for Governmental purposes without payment to me of any royalties thereon.

FIELD OF USE

This invention relates to an improved process of making poly(vinylazide), an energetic material for use as a propellant in large caliber weapons.

BACKGROUND

Poly(vinylchloride) has been reacted with dosium azide with the introduction of azide groups into the polymeric chain. See, M. Takeishi et al., Polymer Letters, 7201 (1969), and H. L. Cohen, Jour. Polymer Science 19, 3269, (1981). However, the product, produced in accordance with the teachings of these references contained 20 to 40 percent of the chlorine originally in the polymeric reactant and this rendered the product, i.e., poly(vinylazide) unacceptable for use in propellant and explosive formulations. The use of poly(vinylazide) of the cited art is accompanied by a high degree of corrosion of the bore of a weapon from which it is fired, and also such energetic polymer produces the formation of a plume which indicates the position of the weapon from which it is fired. The latter telltale plume is produced by the reaction of the HLl present in the formulation with atmospheric moisture.

Surprisingly, we have found that the amount of chlorine in the reaction product of poly(vinylchloride) and sodium azide may be drastically reduced by heating the gel produced in the presence of a metallic azide for an extended period of time. The final product, poly(vinylazide), was found to be highly energetic as indicated by a positive match test.

SUMMARY OF INVENTION

It is therefore an object of this invention to provide an improved process of making poly(vinylazide).

Another object is to provide an improved process of producing poly(vinylazide) wherein the product contains less then about 1.5 percent chlorine by weight.

A further object is to provide a process of making a highly energetic poly(vinylazide) product which is relatively non-corrosive, and acceptable for use in a weapon without the telltale plume of smoke.

Other objects and many of the attendant advantages of this invention will become more apparent from a reading of the following specification wherein the preferred embodiment is described.

DETAILED DESCRIPTION

Example 1

1.0 gm of poly(vinylchloride), 1.5 gm of lithium azide, and 25 ml. of dimethylformamide were heated together at 60° C. with stirring for 24 hours. The temperature of the reaction solution was then raised to 85° C., and maintained at that temperature with stirring for an additional 96 hours.

At the end of the heating stage of the process, the reaction mixture was poured into water producing a precipitate which was subsequently filtered out of the solution. The precipitate was washed with water, then with methanol, and finally dried.

The yield of poly(vinylazide) obtained was 0.8 gm. Upon analysis, the product was found to have 0.14 percent chlorine and 47.0 percent nitrogen.

The infra-red spectrum confirmed the presence of azide groups in the final product.

A sample of the product was heated on a spatula, and found to detonate with an accompanying flame. Thus, the sample gave a positive match test.

Example 2

The procedure of example 1 was followed, however, in this case 2.0 gm of sodium azide was used instead of lithium azide. The yield of product was 0.9 gm. It was found to contain 1.35 percent chlorine and 47.9 percent nitrogen. The precipitate gave a positive match test.

Example 3

The procedure of example 2 was followed but, in this case, dimethyl sulfoxide was utilized as the reaction medium. The yield produced was 0.8 gm, and it was found to contain 1.24 percent chlorine and 44.8 percent nitrogen. Again, the product gave a positive match test.

Example 4

The procedure of example 2 was again followed. However, in this case, the reaction mixture was heated for 72 hours at 65° C. The final product was found to weigh 0.95 gm, and upon analysis, it was found to contain 0.3 percent chlorine and 52.3 percent nitrogen. The product gave a positive match test.

Example 5

The procedure and ingredients of the method of example 2 was repeated. However, in this case, the reaction mixture was heated at 65° C. for 96 hours. The product yield weighed 0.95 gm, and was found by analysis to contain less than 0.38 percent of chlorine and 51.9 percent nitrogen. The product gave a positive match test.

In the art, the reactions of poly(vinylchloride) with sodium azide was stopped before the gelation point which corresponded to the removal of 60 to 80 percent of the chlorine. Using low molecular weight poly(vinylchloride), the effect of continuing the reaction beyond the gelation point was studied as set forth in the foregoing examples. The product of the extended process was analyzed, and the results were set forth in Table 1 which follows:

TABLE 1

Reaction of Gelled Low Molecular Weight PVC with Sodium Azide

| Run | Hours[a] | % N | % Cl | Total C,H,N,Cl |
|---|---|---|---|---|
| 1[b] | 10 | 37.8 | 18.8 | 99.9[c] |
| 2 | 48 | 48.1 | 6.5 | 96.8 |
| 3 | 72 | 52.3 | 0.3 | 95.9 |
| 4 | 96 | 51.9 | 0.4 | 95.5 |
| 5 | 120[d] | 47.9 | 1.4 | 92.5 |
| 6[e] | 120[d] | 44.8 | 1.2 | 91.5 |
| 7[f] | 120[d] | 47.0 | 0.1 | 94.7 |

[a]At 65° C., except as indicated.
[b]This run concluded before gelation.
[c]PVC of high and very high molecular weights also gave 99–100% total under the same conditions.
[d]Run at 65° C. for 24 h, and at 85° C. thereafter.
[e]DMSO used as solvent in this run.
[f]Lithium azide used in this run.

It is to be noted that the chlorine content of the products declines to a fairly low level (<1.5 percent) in 72 hours. Lithium azide is especially effective in dechlorination, possibly because of its much higher solubility in dimethylformamide.

Although the total C, H, N, Cl figures are 99–100 percent for short periods of reaction, the total steadily declines with increasing time and temperature to 91.5 percent. This is presumably the result of atmospheric oxidation which occurs easily with dehydrochlorinated poly(vinylazide). The IR spectrum supports this conclusion, showing hydroxyl peaks at 3400 and 1110 $cm^{-1}$.

The poly(vinylchloride) powders were obtained from Aldrich Chemical Co. in three molecular weights, with densities and inherent viscosities as follows: low molecular weight (1.40; 0.65); high molecular weight (1.40; 1.02); and very high molecular weight (1.385; 1.26).

Dimethylformamide was routinely used as the reaction solvent for the poly(vinylchloride).

The reaction was conducted by stirring and heating a solution of the polymer (1.0 g) in dimethylformamide with excess sodium or lithium azide (1.0 g) without the exclusion of air. The reaction times are noted on the table.

The products were separated by pouring the reaction mixture into water with stirring and acidification with a small amount of 10 percent hydrochloric acid. The solid was separated and triturated with a large-ended stirring rod, first in water, then with two changes of methanol. Alternatively, the product can be filtered.

Previous studies in the art have indicated the poly(-vinylchloride)-sodium azide reaction product to have the composition—$(CH_2CHN_3)_x(CH_2CHCl)_y$—. However, the individual percentages do not agree with that formula. Reasonable agreement is obtained by assuming the formation of some unsaturation by dehydrochlorination. Thus, analysis of a product prepared at 65° C. for 10 hours corresponds to—$(CH_2CHN_3)_6(CH_2CHCl)_4(CH{=}CH)_1$—. Double bond formation is also consistent with the appearance of a broad IR peak at 1600–1650 $cm^{-1}$.

The foregoing disclosure is merely illustrative of the principles of this invention and are not to be interpreted in a limiting sense. I wish it to be understood that I do not desire to be limited to the exact details described because obvious modifications will occur to a person skilled in the art.

What is claimed is:

1. In an improved process of making poly(vinylazide) from poly(vinylchloride) and sodium azide, the improvement consisting of making said poly(vinylazide) acceptable for use in large caliber weapon systems by heating said poly(vinylazide) having the form of a gel in the presence of an excess of sodium azide with stirring at 60° C. for 24 hours, and then heating at 85° C. for 96 hours producing a poly(vinylazide) product containing between about 0.1 and 1.4 percent chlorine by weight.

2. In an improved process of making poly(vinylazide) from poly)vinylchloride) and sodium azide, the improvement consisting of making said poly(vinylazide) acceptable for use in large caliber weapon systems by heating said poly(vinylazide) having the form of a gel in the presence of an excess of sodium azide with stirring at 65° C. for 72 hours producing a poly(vinylazide) product containing 0.3 percent chlorine by weight.

3. In an improved process of making poly(vinylazide) from poly(vinylchloride) and sodium azide, the improvement consisting of making said poly(vinylazide) acceptable for use in large caliber weapon systems by heating said poly(vinylazide) having the form of a gel in the presence of an excess of sodium azide with stirring at 65° C. for 96 hours producing a poly(vinylazide) product containing 0.4 percent chlorine by weight.

4. The improved process of claim 1 wherein sodium azide is replaced by lithium azide.

5. Poly(vinylazide) having the formula—$(CH_2CHN_3)_6(CH_2CHCl)_4(CH{=}CH)_1$—.

6. Poly(vinylazide) having a chlorine content of less than about 1.5 percent by weight.

* * * * *